(12) United States Patent
Davila et al.

(10) Patent No.: US 10,565,020 B2
(45) Date of Patent: Feb. 18, 2020

(54) ADJUSTMENT OF THE NUMBER OF CENTRAL PROCESSING UNITS TO MEET PERFORMANCE REQUIREMENTS OF AN I/O RESOURCE

(71) Applicant: INTERNATIONAL BUSINESS MACHINES CORPORATION, Armonk, NY (US)

(72) Inventors: Veronica S. Davila, Tucson, AZ (US); Trung N. Nguyen, Vail, AZ (US); Louis A. Rasor, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 199 days.

(21) Appl. No.: 15/689,430

(22) Filed: Aug. 29, 2017

(65) Prior Publication Data

US 2019/0065257 A1 Feb. 28, 2019

(51) Int. Cl.
*G06F 9/46* (2006.01)
*G06F 9/50* (2006.01)
*G06F 9/48* (2006.01)

(52) U.S. Cl.
CPC ............ *G06F 9/505* (2013.01); *G06F 9/4881* (2013.01); *G06F 9/5044* (2013.01); *G06F 9/5038* (2013.01)

(58) Field of Classification Search
None
See application file for complete search history.

(56) References Cited

U.S. PATENT DOCUMENTS

| | | | | |
|---|---|---|---|---|
| 5,481,707 A | * | 1/1996 | Murphy, Jr. | .......... G06F 9/5027 710/1 |
| 6,195,750 B1 | | 2/2001 | Ellsworth | |
| 6,782,410 B1 | | 8/2004 | Bhagat et al. | |
| 8,595,721 B2 | | 11/2013 | Nayar et al. | |
| 8,607,245 B2 | * | 12/2013 | Sakaguchi | ............ G06F 9/5061 718/106 |

OTHER PUBLICATIONS

J. Savit, "Dedicated CPUs in Zones—A Small RM Exercise," Oracle, Blog, posted Nov. 8, 2009, https://blogs.oracle.com/jsavit/dedicated-cpus-in-zones-a-small-rm-exercise, pp. 17.

* cited by examiner

*Primary Examiner* — Wissam Rashid
(74) *Attorney, Agent, or Firm* — Rabindranath Dutta; Konrad Raynes Davda & Victor LLP

(57) ABSTRACT

A plurality of central processing units (CPUs) are allocated as a set of dedicated CPUs for processing tasks of an input/output (I/O) resource. In response to determining that a CPU utilization for the set of dedicated CPUs is less than a first predetermined threshold, at least one CPU of the set of dedicated CPUs is configured as a reserved CPU to execute tasks for one or more entities other than the I/O resource. In response to determining that a CPU utilization for the set of dedicated CPUs is greater than a second predetermined threshold, the reserved CPU is configured as a dedicated CPU to process tasks for the I/O resource.

20 Claims, 10 Drawing Sheets

ADJUSTMENT OF THE NUMBER OF CENTRAL PROCESSING UNITS TO MEET PERFORMANCE REQUIREMENTS OF AN I/O RESOURCE

BACKGROUND

1. Field

Embodiments relate to the adjustment of the number of central processing units (CPUs) to meet performance requirements of an input/output (I/O) resource.

2. Background

A storage controller may control access to storage for one or more host computational devices that may be coupled to the storage controller over a network. A storage management application that executes in the storage controller may manage a plurality of storage devices, such as disk drives, tape drives, flash drives, direct access storage devices (DASD), etc., that are coupled to the storage system. A host computational device may send Input/Output (I/O) commands to the storage controller and the storage controller may execute the I/O commands to read data from the storage devices or write data to the storage devices.

The storage controller may include two or more servers, where each server may be referred to as a node, a storage server, a processor complex, a Central Processor Complex (CPC), or a Central Electronics Complex (CEC). Each server may be included in a cluster. Each server may have a plurality of central processing units and the servers may share the workload of the storage controller. In a two server configuration of the storage controller, either server can failover to the other if there is a failure or a planned downtime for one of the two servers.

SUMMARY OF THE PREFERRED EMBODIMENTS

Provided are a method, a system, a computer program product in which a plurality of central processing units (CPUs) are allocated as a set of dedicated CPUs for processing tasks of an input/output (I/O) resource. In response to determining that a CPU utilization for the set of dedicated CPUs is less than a first predetermined threshold, at least one CPU of the set of dedicated CPUs is configured as a reserved CPU to execute tasks for one or more entities other than the I/O resource. In response to determining that a CPU utilization for the set of dedicated CPUs is greater than a second predetermined threshold, the reserved CPU is configured as a dedicated CPU to process tasks for the I/O resource.

In certain embodiments, the I/O resource has higher requirements for performance in comparison to the one or more entities other than the I/O resource, and the second threshold is greater than the first threshold.

In further embodiments, the I/O resource is a host bus adapter that communicatively couples a storage controller to a host computational device, or a device adapter that communicatively couples the storage controller to a storage device, and wherein the storage controller responds to I/O requests from the host computational device by retrieving data from the storage device.

In additional embodiments, a predetermined interval of time is set. In response to determining that for a plurality of predetermined intervals of time, the CPU utilization is less than the first predetermined threshold, the configuring of at least one CPU of the set of dedicated CPUs as the reserved CPU to execute tasks for one or more entities other than the I/O resource is performed.

In yet additional embodiments, in response to determining that for the plurality of predetermined intervals of time, the CPU utilization is greater than the second predetermined threshold, the configuring of the reserved CPU as the dedicated CPU to process tasks for the I/O resource is performed.

In further embodiments, in response to determining that for one predetermined interval of time, the CPU utilization is greater than a third predetermined threshold, the performing of the configuring of the reserved CPU as the dedicated CPU to process tasks for the I/O resource is performed.

In yet further embodiments, the third predetermined threshold is greater than the second predetermined threshold, wherein the second predetermined threshold is greater than the first predetermined threshold.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

A storage controller may include a plurality of CPUs, where the plurality of CPUs may be shared to execute tasks associated with different I/O resources, such as host bus adapters and device adapters. In certain storage controllers there is a need to dedicate CPU resources to an I/O resource in order to meet the performance requirements of the I/O resource. For example, an I/O resource may need a response time of 20-37 microseconds. However, the storage controller still has to service other I/O requests besides I/O requests that have low response time requirements, so balancing is required between dedicated and non-dedicated CPU resources allocated to meet the performance requirements of the I/O resource and yet allow optimal use of CPU resources for other I/O workloads.

In certain embodiments, an I/O resource that needs dedicated CPU resources may be allocated a group of CPUs to meet its performance requirements. While executing the tasks of the I/O resource, if it is determined that the performance requirements can be meet with less than the number of CPUs in the group, then a CPU may be deallocated from the group to execute tasks for other entities. While executing the tasks of the I/O resource, if it is determined that a deallocated CPU from the group is needed to meet the performance requirements then the deallocated CPU may be allocated back to the group.

Therefore, certain embodiments allocate dedicated CPUs to perform tasks for an I/O resource, such as a host bus adapter or a device adapter of a storage controller. If the dedicated CPUs become underutilized for the I/O resource, then a CPU may be released for use by other entities. If the I/O resource needs additional CPUs to meet performance requirements, then the released CPUs are again used to perform the tasks of the I/O resource.

Exemplary Embodiments

Figure 1:
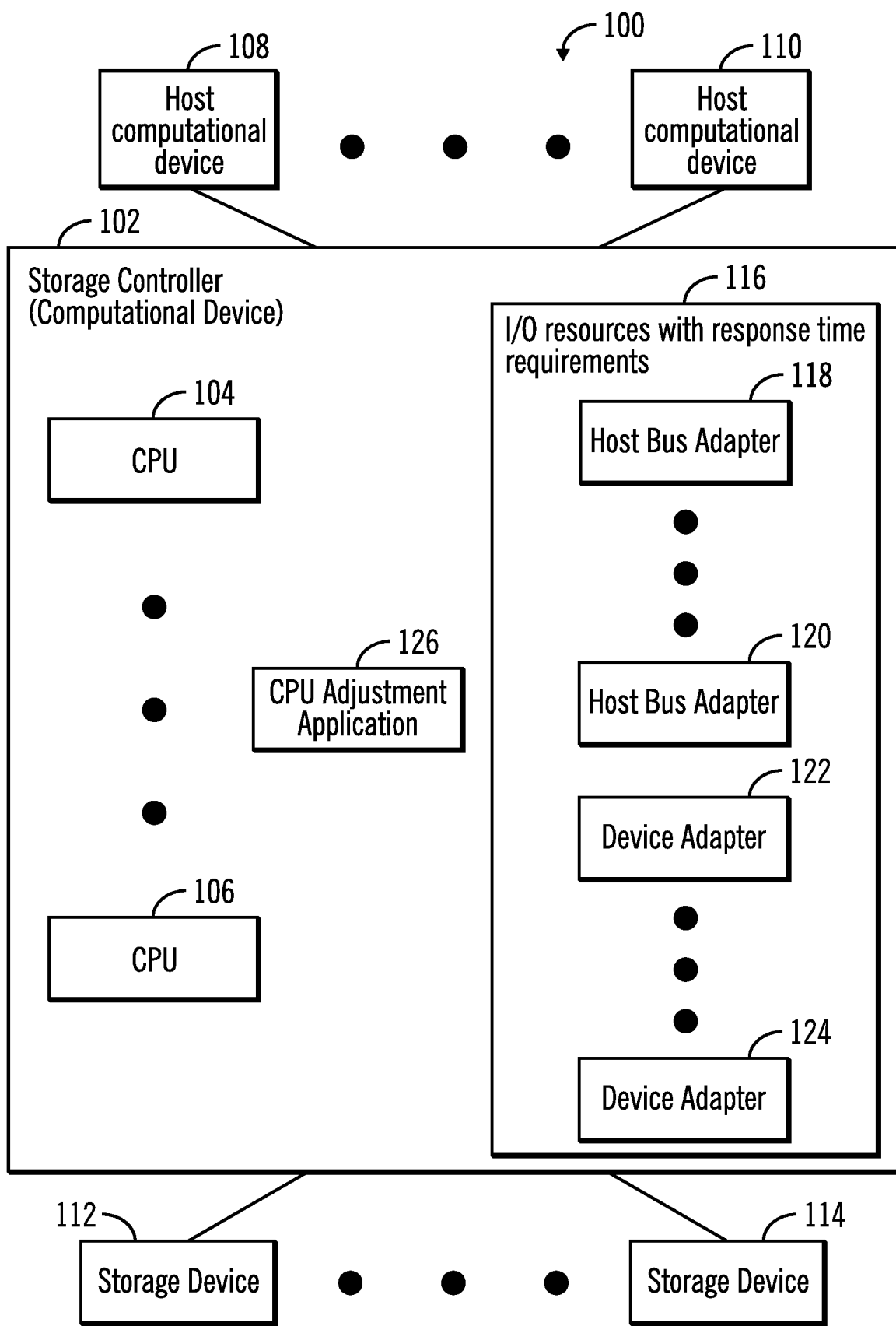
FIG. 1 illustrates a block diagram of a computing environment comprising a storage controller with a plurality of central processing units communicatively coupled to a plurality of host computational devices and a plurality of storage devices, in accordance with certain embodiments.

FIG. 1 illustrates a block diagram of a computing environment 100 comprising a storage controller 102 with a plurality of central processing units (CPUs) 104, 106 communicatively coupled to a plurality of host computational devices 108, 110 and a plurality of storage devices 112, 114, in accordance with certain embodiments.

The storage controller 102 and the host computational devices 108, 110 may comprise any suitable computational device including those presently known in the art, such as, a personal computer, a workstation, a server, a mainframe, a hand held computer, a palm top computer, a telephony device, a network appliance, a blade computer, a processing device, a controller, etc. The storage controller may be comprised of a plurality of servers (not shown) that may provide redundancy because if one server undergoes a failure from which recovery is not possible, then an alternate server may perform the functions of the server that failed. Each of the plurality of servers may be referred to as a processing complex or a central electronics complex (CEC) and may include one or more processors and/or processor cores, such as the CPUs 104, 106. The storage controller 102 may also be referred to as a dual-server storage system.

The storage controller 102 and the host computational devices 108, 110 may be elements in any suitable network, such as, a storage area network, a wide area network, the Internet, an intranet. In certain embodiments, the storage controller 102 and the host computational devices 108, 110 may be elements in a cloud computing environment. While only two CPUs are identified by reference numerals 104, 106 in FIG. 1, it is understood that there may be more than two CPUs in the storage controller 102.

The storage controller 102 includes a plurality of I/O resources 116, such as a plurality of host bus adapters 118, 120 and a plurality of device adapters 122, 124. The plurality of host bus adapters 118, 120 communicatively couples the storage controller 102 to the host computational devices 108, 110. The plurality of device adapters 122, 124 communicatively couples the storage controller 102 to the storage devices 112, 114. The I/O resources 116 may have response time requirements below a certain threshold (such as 30 ms.), so that I/O operations from a host computational device 108 are responded to in a timely manner by the storage controller 102 from data stored in the storage devices 112, 114.

In certain embodiments, a CPU adjustment application 126 implemented in software, firmware, hardware or any combination thereof executes in the storage controller 102. The CPU adjustment application 126 allocates one or more CPUs selected from the plurality of CPUs 104,106 for dedicated usage by each I/O resource included in the I/O resources 116. The CPU adjustment application 126 also performs an adjustment of the number of CPUs allocated for dedicated usage by each I/O resource based on the level of utilization of CPUs allocated for dedicated usage by each I/O resource.

Figure 2:
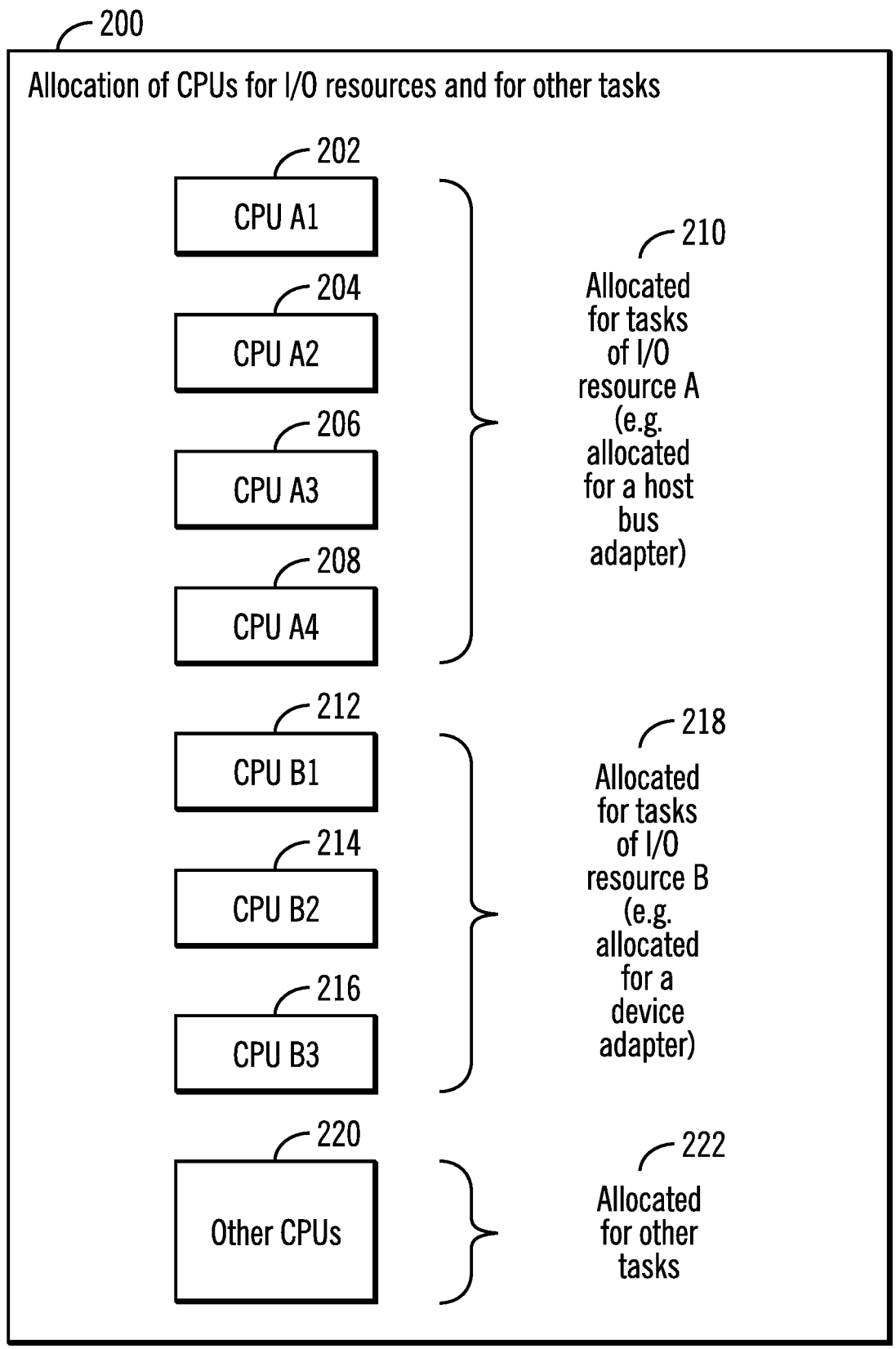
FIG. 2 illustrates a block diagram that shows allocation of CPUs for I/O resources and for other tasks, in accordance with certain embodiments.

FIG. 2 illustrates a block diagram 200 that shows allocation of CPUs for the I/O resources 116 and for other tasks that are not performed by the I/O resources 116, in accordance with certain embodiments.

In FIG. 2, CPU A1 202, CPU A2 204, CPU A3 206 and CPU A4 208 are allocated for tasks of an exemplary I/O resource A (as shown via reference numeral 210). For example, in certain embodiments I/O resource A may be one of the host bus adapters 118, 120.

Additionally, in FIG. 2, CPU B1 212, CPU B2 214 and CPU B3 216 are allocated for tasks of an exemplary I/O resource B (as shown via reference numeral 218). For example, in certain embodiments I/O resource B may be one of the device adapters 122, 124.

The other CPUs 220 may be allocated for other tasks than the tasks performed by the I/O resources 116 that include the host bus adapters 118, 120 and the device adapters 122, 124 (as shown via reference numeral 222).

In certain embodiments, the CPU adjustment application 126 allocates no more than a predetermined percentage (e.g. 25%) of CPUs selected from the plurality of CPUs 104, 106 for the I/O resources 116 that have response time requirements below a predetermined threshold. As a result, the other tasks besides the I/O resources 116 are not starved of processing cycles on CPUs.

Figure 3:
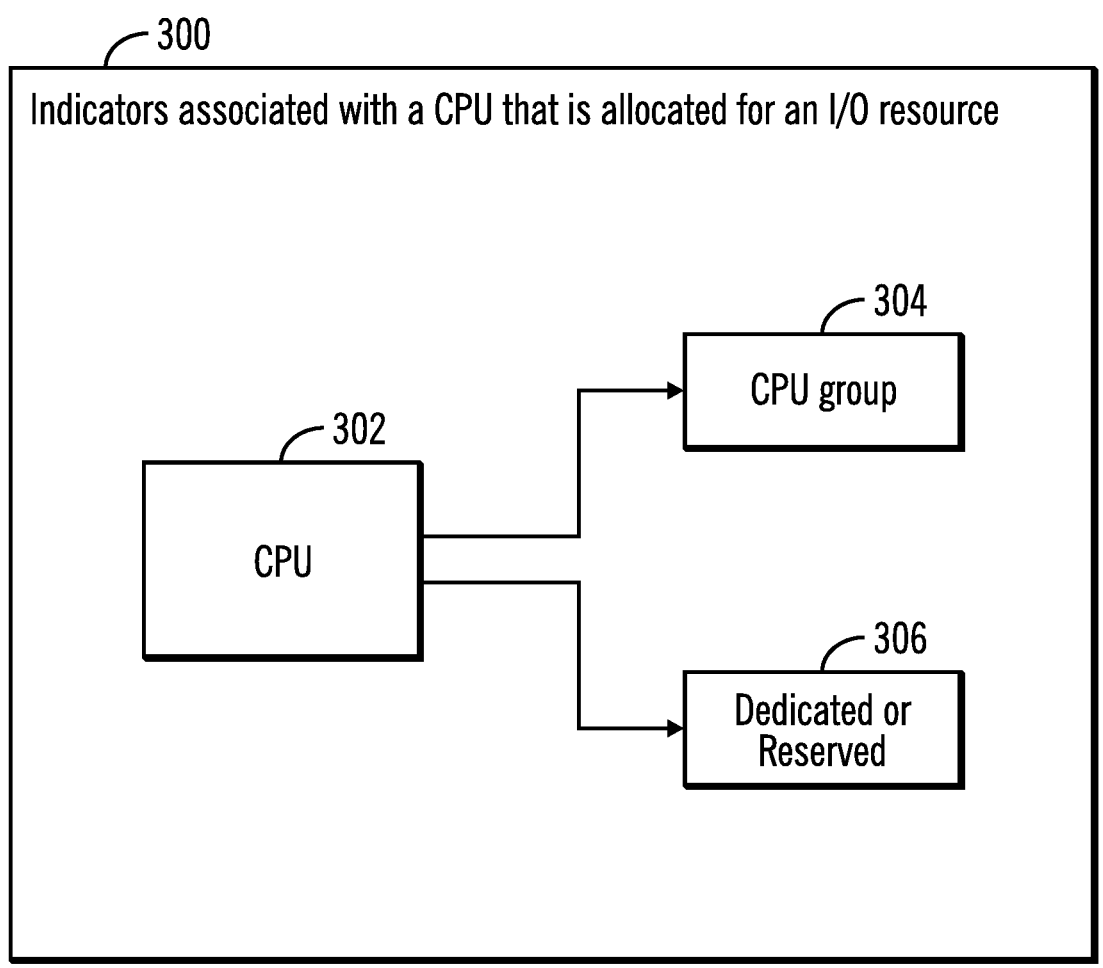
FIG. 3 illustrates a block diagram that shows indicators associated with a CPU that is allocated for an I/O resource, in accordance with certain embodiments.

FIG. 3 illustrates a block diagram 300 that shows indicators associated with a CPU 302 that is allocated for an I/O resource, in accordance with certain embodiments. The indicator "CPU group" indicates a group to which the CPU 302 belongs, and the indicator "dedicated or reserved" 306 indicates whether the CPU 302 is a dedicated CPU or a reserved CPU. The CPU adjustment application 126 generates a group of CPUs for each I/O resource included in the I/O resources 116. Each CPU in a group may be either dedicated or reserved. If a CPU is indicated as dedicated for a group, then the CPU is allocated for processing the tasks of the I/O resource for which the group has been formed. If a CPU is indicated as reserved for a group, then the CPU is allowed to be used by tasks other than the tasks of the I/O resource for which the group has been formed, if CPU utilization for the group is sufficiently low (e.g., below a predetermined threshold). If a CPU is indicated as reserved for a group, then if the CPU utilization for the group is sufficiently high (e.g., above a predetermined threshold), then the reserved CPU may stop executing other tasks and return to the processing of tasks of the I/O resource for which the group was formed.

Figure 4:
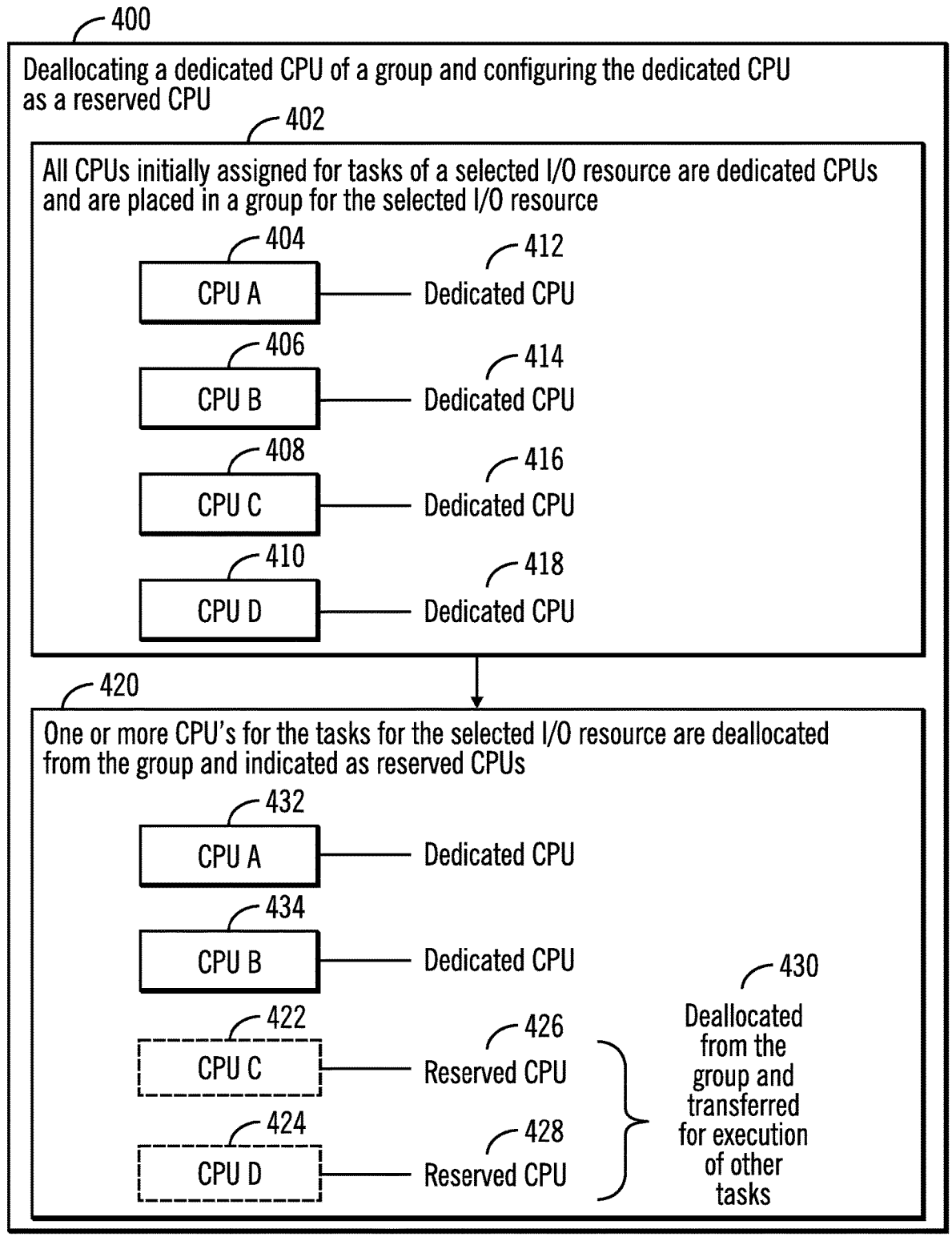
FIG. 4 illustrates a block diagram that shows the deallocating of a dedicated CPU of a group and configuring of the dedicated CPU as a reserved CPU, in accordance with certain embodiments.

FIG. 4 illustrates a block diagram that shows the deallocating of a dedicated CPU of a group and configuring the dedicated CPU as a reserved CPU, in accordance with certain embodiments.

Block 402 shows that all CPUs (i.e., CPU A 404, CPU B 406, CPU C 408, CPU D 410) of a group corresponding to an I/O resource are initially indicated to be a dedicated CPU (as shown via reference numeral 412, 414, 416, 418).

Block 420 shows that if the CPU adjustment application 126 determines that the utilization of the CPUs A, B, C, D 404, 406, 408, 410 has fallen below a predetermined threshold (i.e., the CPUs A, B, C, D 404, 406, 408, 410 are not being adequately utilized by the I/O resource), then the CPU adjustment application 126 may deallocate CPU C 422 and CPU D 424 from the group corresponding to the I/O resource and indicate them as reserved CPUs 426, 428 for temporary use by tasks other than the tasks of I/O resource (as shown via reference numeral 430). If the processor utilization calculated for CPU A and CPU B that are still dedicated CPUs exceeds another predetermined threshold, then one or more of the reserved CPUs C, D 426, 428 may be configured as dedicated CPUs.

Figure 5:
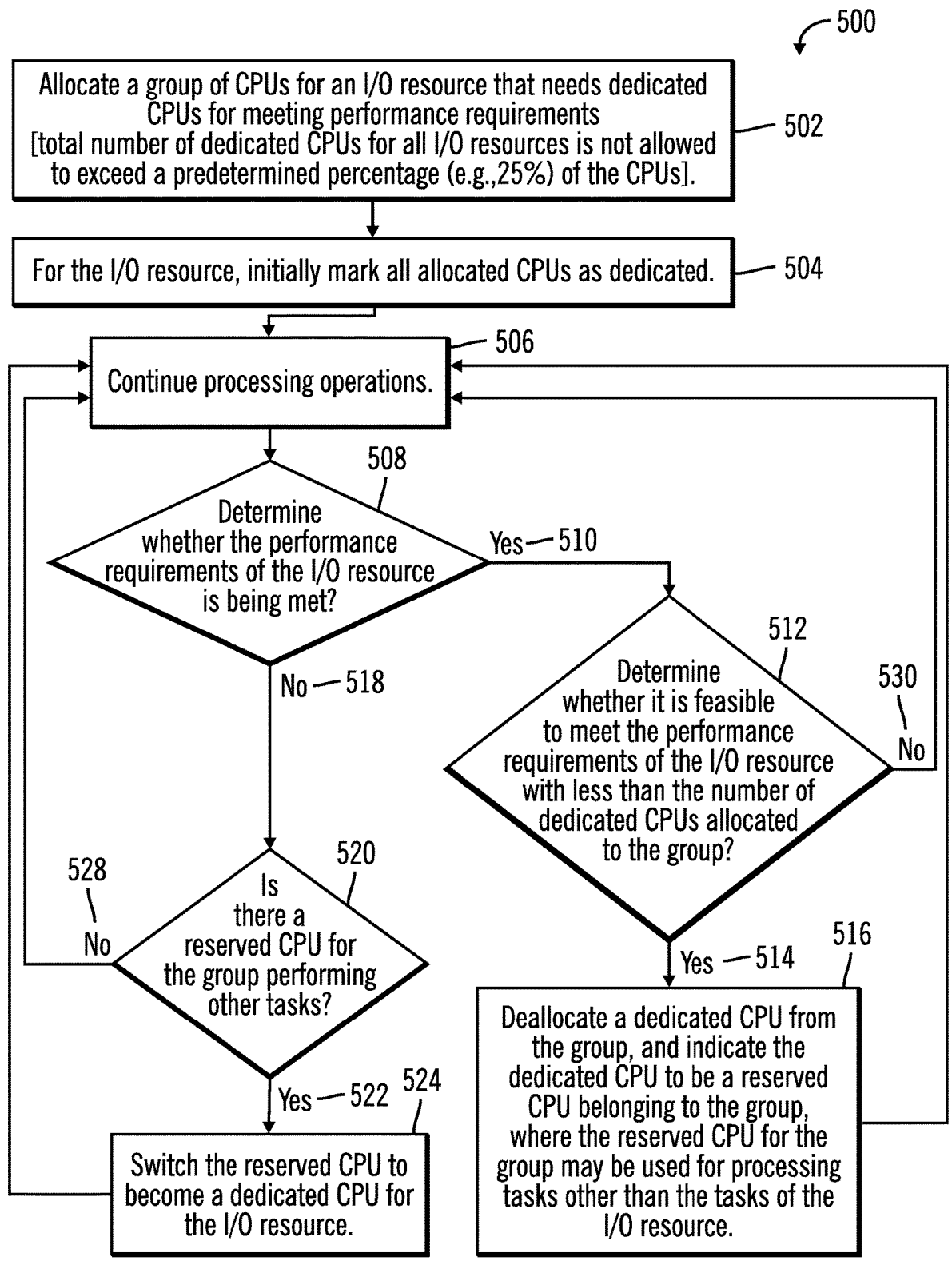
FIG. 5 illustrates a first flowchart for adjusting the number of CPUs allocated to an I/O resource, in accordance with certain embodiments.

FIG. 5 illustrates a first flowchart 500 for adjusting the number of CPUs allocated to an I/O resource, in accordance with certain embodiments. The operations shown in FIG. 5 may be performed by the CPU adjustment application 126 that executes in the storage controller 102.

Control starts at block 502 in which the CPU adjustment application 126 allocates a group of CPUs for an I/O resource that needs dedicated CPUs for meeting performance requirements. In certain embodiments, the total number of dedicated CPUs for all I/O resources 116 with response time requirements below a predetermined threshold amount of time is not allowed to exceed a predetermined percentage (e.g., 25%) of the CPUs.

From block 502 control proceeds to block 504 in which, the CPU adjustment application 126 initially marks all allocated CPUs as dedicated for the I/O resource, and then processing operations continue (at block 506) in the storage controller 102.

From block 506, control proceeds to block 508 in which the CPU adjustment application 126 determines whether the performance requirements of the I/O resource is being met. If so, ("Yes" branch 510) control proceeds to block 512 where the CPU adjustment application 126 determines whether it is feasible to meet the performance requirements of the I/O resource with less than the number of dedicated CPUs allocated to the group. If so, ("Yes" branch 514) control proceeds to block 516 in which the CPU adjustment application 126 deallocates a dedicated CPU from the group, and indicates the dedicated CPU to be a reserved CPU belonging to the group, where the reserved CPU for the group may be used for processing tasks other than the tasks of the I/O resource.

If at block 508 the CPU adjustment application 126 determines that the performance requirements of the I/O resource is not being met ("No" branch 518) then control proceeds to block 520 in which in which the CPU adjustment application 126 determines if there a reserved CPU for the group that is performing other tasks. If so ("Yes branch 522), then the CPU adjustment application 126 switches (at block 524) the reserved CPU to become a dedicated CPU for the I/O resource.

If at block 520 the CPU adjustment application 126 determines that there is no reserved CPU for the group performing other tasks ("No" branch 528), then control returns to block 506 for continuing processing operations. If at block 512, the CPU adjustment application 126 determines that it is not feasible to meet the performance requirements of the I/O resource with less than the number of dedicated CPUs allocated to the group ("No" branch 530), then control returns to block 506 for continuing processing operations. Additionally, at the conclusion of the operations shown in blocks 524, 516, control returns to block 506 for continuing processing operations.

Therefore, FIG. 5 illustrates certain embodiments in which if it is feasible to meet the performance requirements of the I/O resource with less than the number of dedicated CPUs allocated to the group for the I/O resource, one or more dedicated CPUs from the group are indicated as reserved and may be used for processing tasks other than the tasks of the I/O resource. If the performance requirements of the I/O resource are not met, then if there is a reserved CPU, then the reserved CPU is switched to become a dedicated CPU for the I/O resource.

Figure 6:
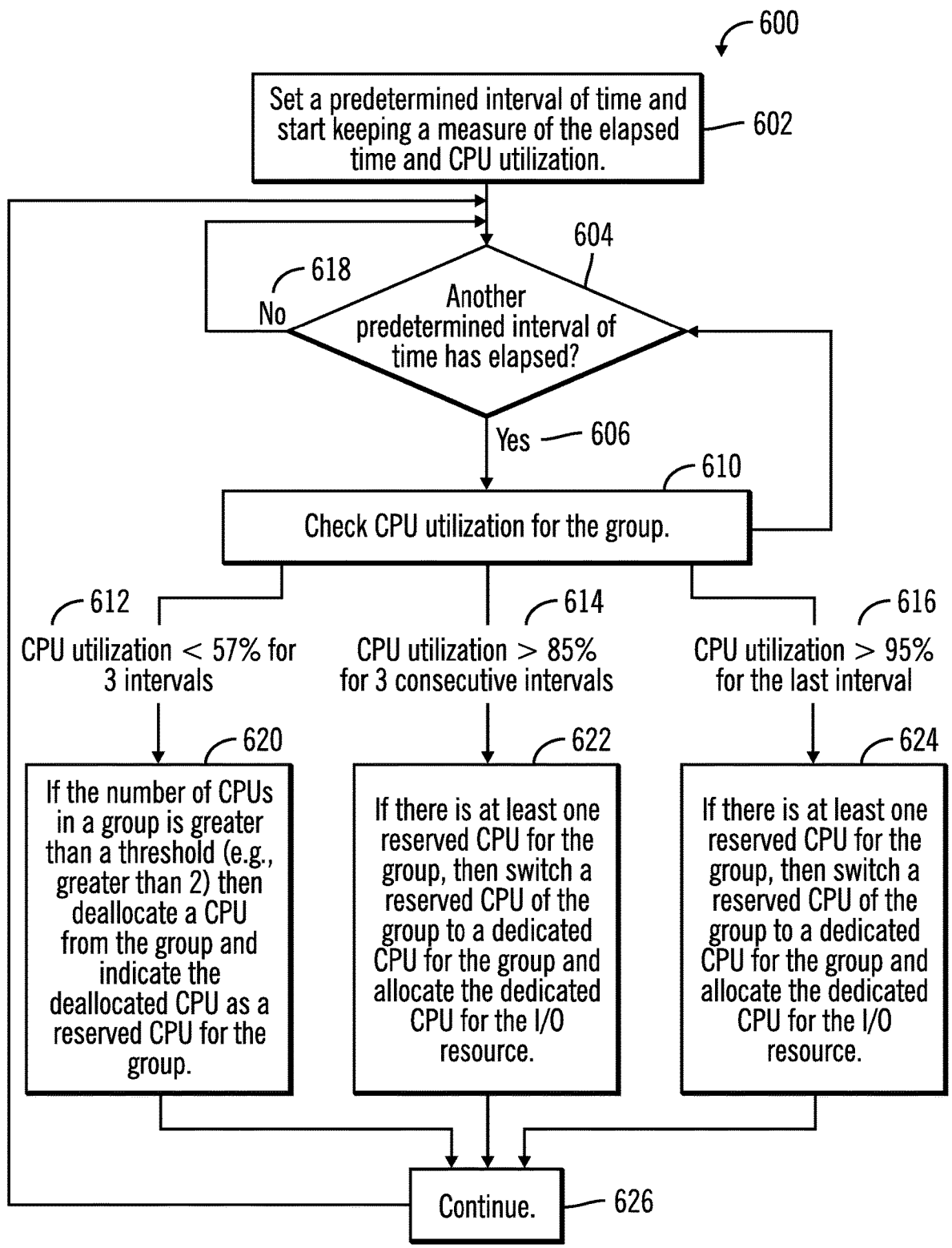
FIG. 6 illustrates a second flowchart for adjusting the number of CPUs allocated to an I/O resource, in accordance with certain embodiments.

FIG. 6 illustrates a second flowchart 600 for adjusting the number of CPUs allocated to an I/O resource, in accordance with certain embodiments. The operations shown in FIG. 6 may be performed by the CPU adjustment application 126 that executes in the storage controller 102.

Control starts at block 602 in which the CPU adjustment application 126 sets a predetermined interval of time (e.g., 5 seconds) and start keeping a measure of the elapsed time and CPU utilization, where CPU utilization is the percentage of CPU cycles that are used for execution of operation and are not idle processing cycles. Control proceeds to block 604 in which the CPU adjustment application 126 determines whether the predetermined interval of time has elapsed. If so ("Yes" branch 606) the CPU adjustment application 126 checks (at block 610) the CPU utilization for a group of CPUs that are processing tasks for an I/O resource.

From block 610 control proceeds via branch 612, 614 if at least initially 3 predetermined intervals of time have elapsed. It should be noted that instead of 3 predetermined intervals of time, alternative embodiments may use some other number such as 4, 5, 6, 7, etc., for the number of intervals of time. Otherwise, control proceeds to branch 616 and also returns in parallel to block 604. Once 3 predetermined intervals of time have elapsed for the first set of iterations, control may proceed in parallel to branches 612, 614, 616 and also return to block 604. From block 604 control again returns to block 604, if the predetermined interval of time has not elapsed ("No" branch 618).

If the CPU utilization is less than a first threshold percentage (e.g. 57%) for the 3 previous consecutive intervals of time, then if the number of dedicated CPUs in a group is greater than a threshold (e.g., greater than 2), the CPU adjustment application 126 deallocates (at block 620) a CPU from the group and indicates the deallocated CPU as a reserved CPU for the group. The threshold number of dedicated CPUs remaining in a group, for deallocation of a CPU to occur, should not be less than 1, This is because the last dedicated CPU should not be deallocated If the CPU utilization is determined to be greater than a second threshold percentage (e.g. 85%) for 3 previous consecutive intervals of time (at branch 614), then if there is at least one reserved CPU for the group, the CPU adjustment application 126 switches a reserved CPU of the group to a dedicated CPU for the group and allocates the dedicated CPU for the I/O resource (at block 622).

If the CPU utilization is determined to be greater than a third threshold percentage (e.g. 85%) for the last interval of time (at branch 616), then if there is at least one reserved CPU for the group, the CPU adjustment application 126 switches a reserved CPU of the group to a dedicated CPU for the group and allocates the dedicated CPU for the I/O resource (at block 624). From blocks 620, 622, 624 control continues to block 626 and returns to block 604.

Figure 7:
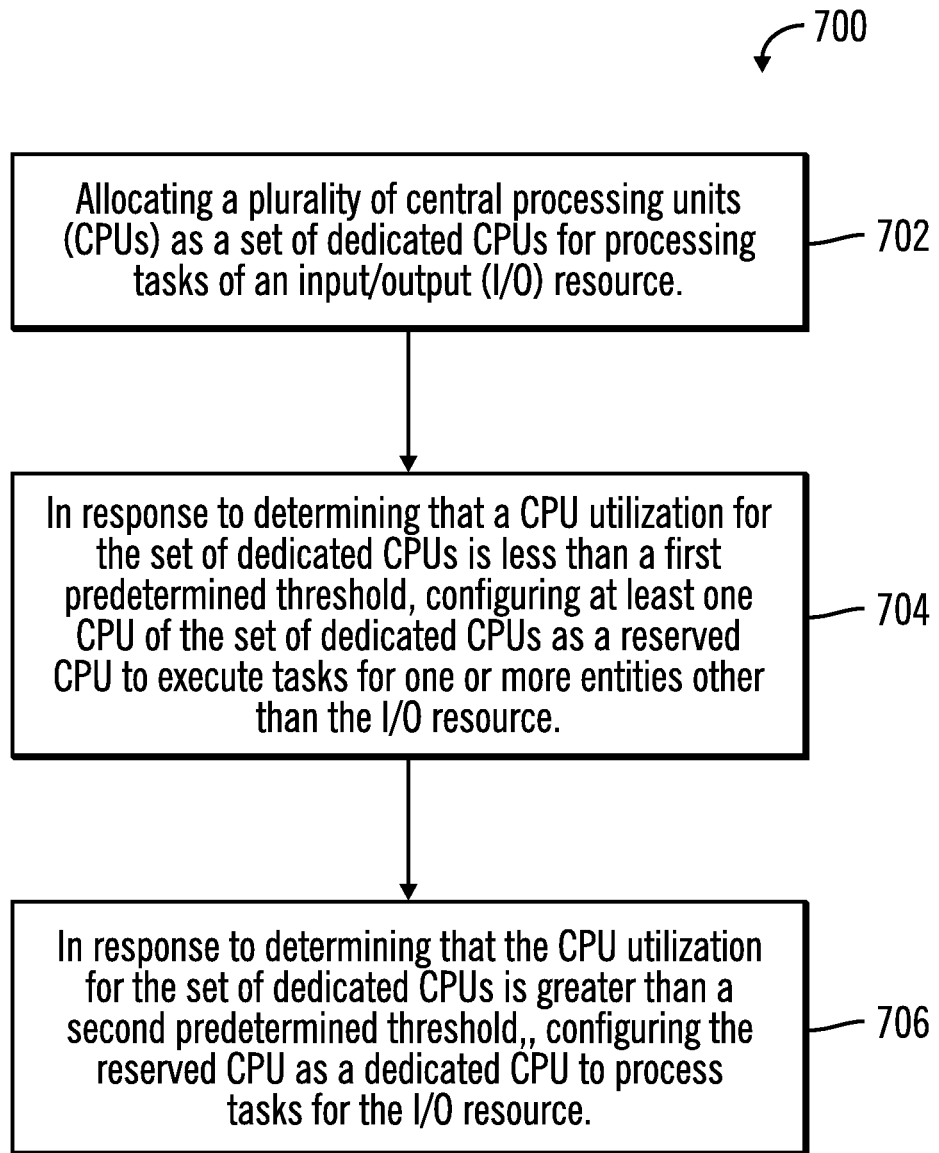
FIG. 7 illustrates a third flowchart for adjusting the number of CPUs allocated to an I/O resource, in accordance with certain embodiments.

Therefore, FIG. 7 illustrates certain embodiments, in which if the CPU utilization is too low (e.g., below 57%) for a group for 3 intervals of time then a CPU is deallocated. If the CPU utilization is high (e.g., above 85%) for 3 intervals of time then a reserved CPU is configured to be a dedicated CPU. However if the CPU utilization is very high (e.g., above 95%) even for a single interval, then a reserved CPU is configured to be a dedicated CPU.

FIG. 7 illustrates a third flowchart 700 for adjusting the number of CPUs allocated to an I/O resource, in accordance with certain embodiments. The operations shown in FIG. 7 may be performed by the CPU adjustment application 126 that executes in the storage controller 102.

Control starts at block 702 in which the CPU adjustment application 126 allocates a plurality of central processing units (CPUs) as a set of dedicated CPUs for processing tasks of an input/output (I/O) resource. From block 702 control proceeds to block 704, in which in response to determining that a CPU utilization for the set of dedicated CPUs is less than a first predetermined threshold, at least one CPU of the set of dedicated CPUs is configured as a reserved CPU to execute tasks for one or more entities other than the I/O resource.

From block 704, control proceeds to block 706 in which in response to determining that a CPU utilization for the set of dedicated CPUs is greater than a second predetermined threshold, the reserved CPU is configured as a dedicated CPU to process tasks for the I/O resource.

Therefore, FIGS. 1-7 illustrate certain embodiments in which the number of dedicated CPUs allocated for an I/O resource is adjusted based on the utilization level of the dedicated CPUs.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
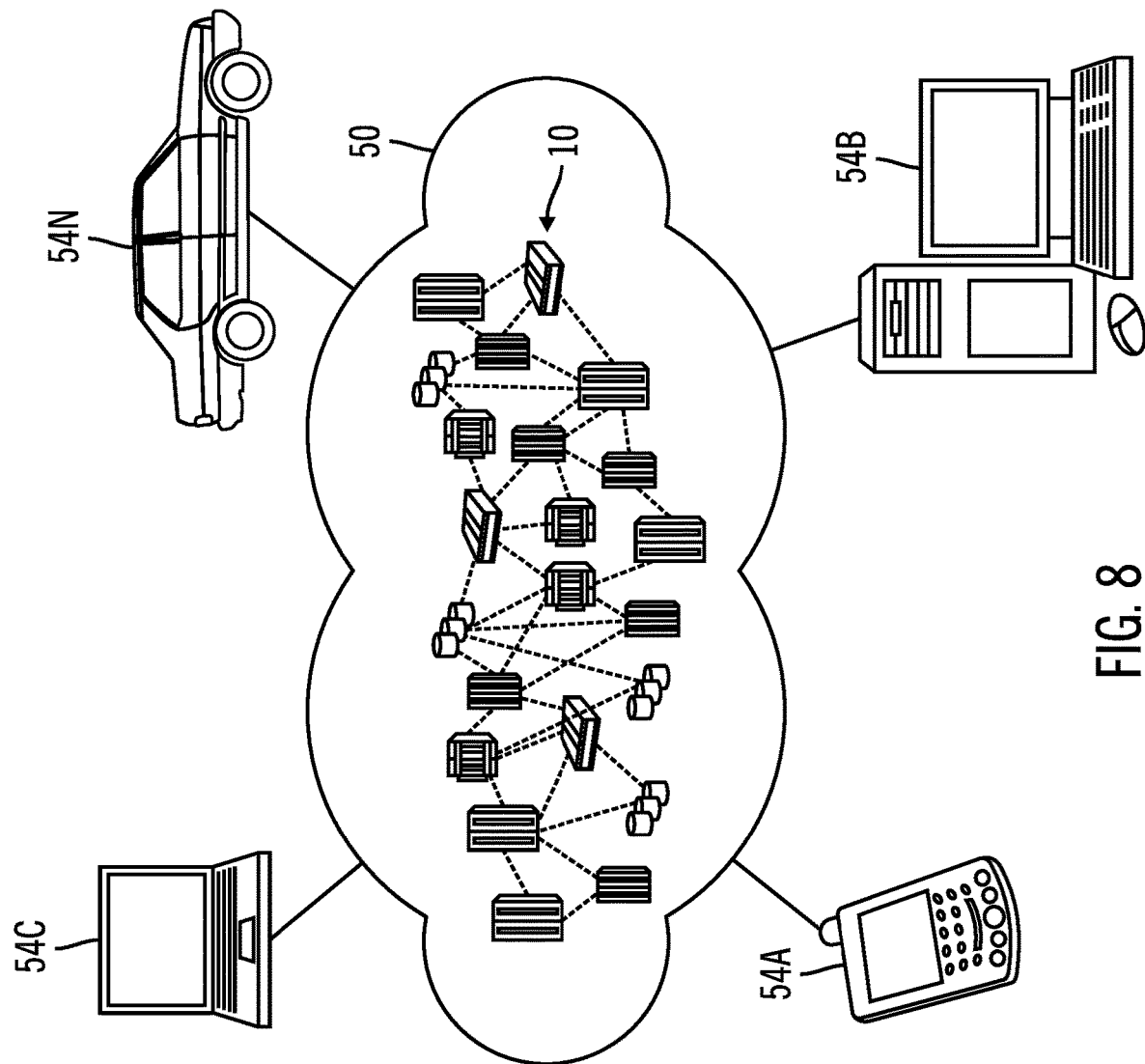
FIG. 8 illustrates a block diagram of a cloud computing environment, in accordance with certain embodiments.

Referring now to FIG. 8, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
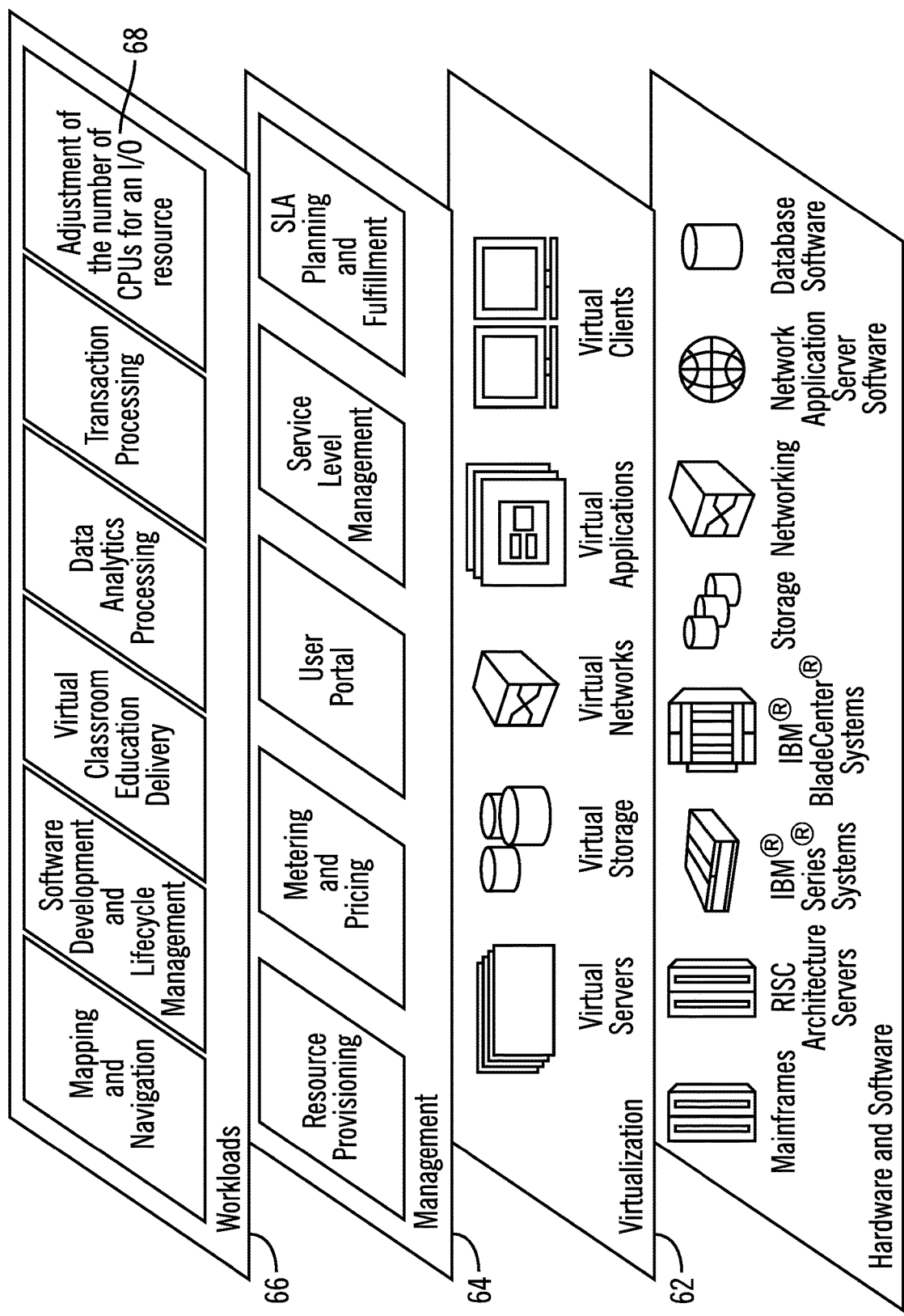
FIG. 9 illustrates a block diagram of further details of the cloud computing environment of FIG. 8, in accordance with certain embodiments.

Referring now to FIG. 9 a set of functional abstraction layers provided by cloud computing environment 50 (FIG. 8) is shown. It should be understood in advance that the components, layers, and functions shown in FIG. 8 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the adjustment of the number of CPUs for an I/O resource 68 as shown in FIGS. 1-8.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
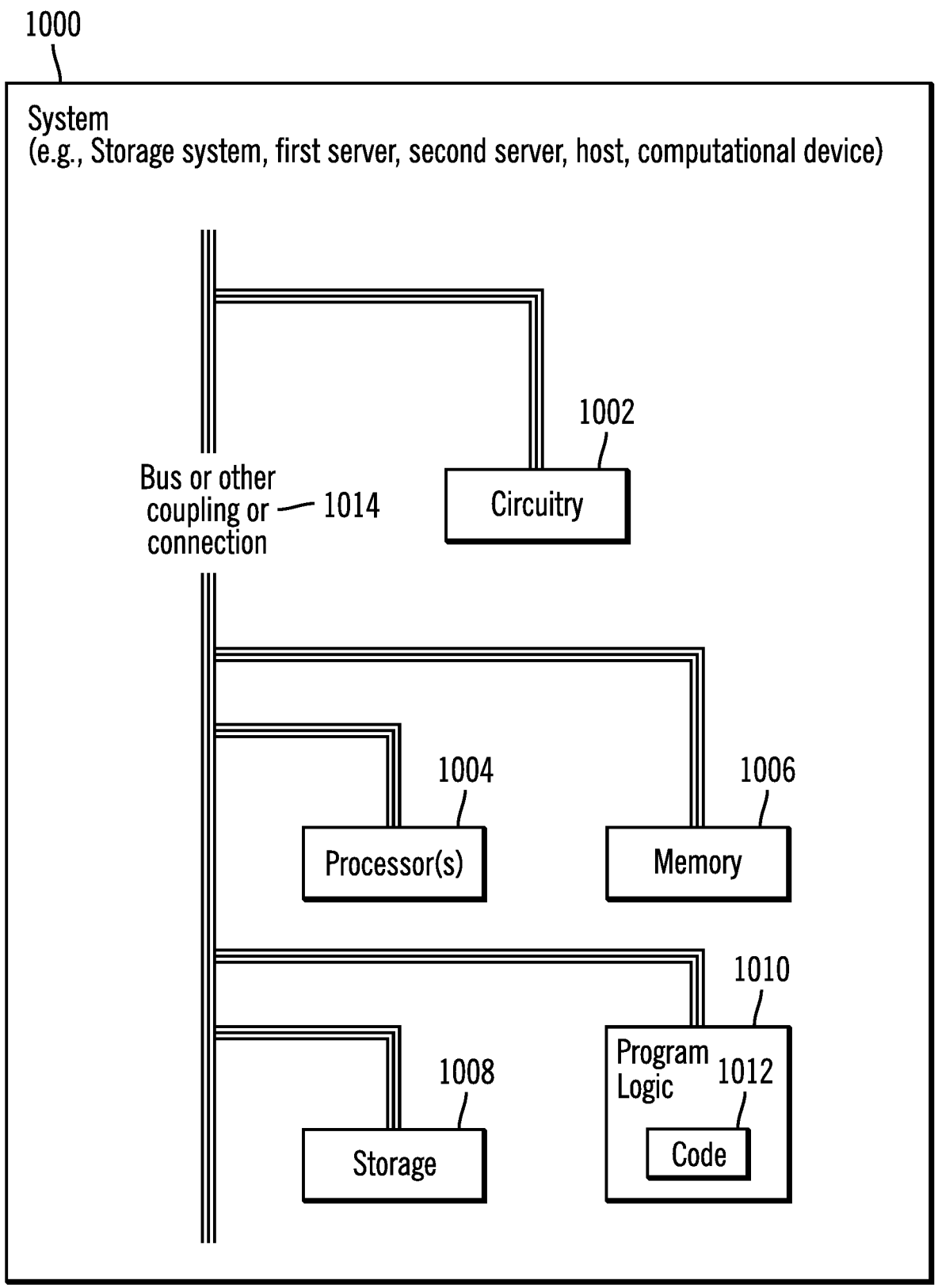
FIG. 10 illustrates a block diagram of a computational system that shows certain elements that may be included in the storage system, servers, and/or the host(s), as described in FIGS. 1-9, in accordance with certain embodiments.

FIG. 10 illustrates a block diagram 1000 that shows certain elements that may be included in the storage controller 102 that may comprise a storage system with a first server and optionally a second server, and the host computational devices 108, 110 (also referred to as hosts) or other computational devices in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. One or more of the components in the system 1000 may communicate via a bus or via other coupling or connection 1014. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

*IBM, zSeries, pSeries, xSeries, BladeCenter, WebSphere, and DB2 are trademarks of International Business Machines Corporation registered in many jurisdictions worldwide.

What is claimed is:

1. A method, comprising:

allocating a plurality of central processing units (CPUs) as a set of dedicated CPUs for processing tasks of an input/output (I/O) resource, wherein the plurality of CPUs form a group, and wherein allocated CPUs are not transferable from one group to another group;

determining whether performance requirements of the I/O resource are being met;

in response to determining that performance requirements of the I/O resource are not being met, determining whether there is a reserved CPU in the group that is performing tasks other than the tasks of the I/O resource, and in response to determining there is a reserved CPU in the group performing tasks other than the tasks of the I/O resource, switching the reserved CPU to become a dedicated CPU for processing the tasks of the I/O resource;

in response to determining that performance requirements of the I/O resource are being met, determining whether it is feasible to meet the performance requirements of the I/O resource with fewer than a number of dedicated CPUs allocated for processing the tasks of the I/O resource, and in response to determining that it is feasible to meet the performance requirements of the I/O resource with fewer than the number of dedicated CPUs allocated for processing the tasks of the I/O resource, deallocating a dedicated CPU from the group and indicating the dedicated CPU that is deallocated to be a reserved CPU belonging to the group, wherein the reserved CPU for the group is usable for processing tasks other than the tasks of the I/O resource;

in response to determining that a CPU utilization for the set of dedicated CPUs is less than a first predetermined threshold, configuring at least one CPU of the set of dedicated CPUs as a reserved CPU to execute tasks for one or more entities other than the I/O resource; and in response to determining that the CPU utilization for the set of dedicated CPUs is greater than a second predetermined threshold, configuring the reserved CPU as a dedicated CPU to process tasks for the I/O resource.

2. The method of claim 1, wherein the I/O resource has higher requirements for performance in comparison to the one or more entities other than the I/O resource, and wherein the second predetermined threshold is greater than the first predetermined threshold.

3. The method of claim 2, wherein the I/O resource is a host bus adapter that communicatively couples a storage controller to a host computational device, or a device adapter that communicatively couples the storage controller to a storage device, and wherein the storage controller responds to I/O requests from the host computational device by retrieving data from the storage device.

4. The method of claim 1, the method further comprising:
setting a predetermined interval of time; and
in response to determining that for a plurality of predetermined intervals of time, the CPU utilization is less than the first predetermined threshold, performing the configuring of the at least one CPU of the set of dedicated CPUs as the reserved CPU to execute tasks for one or more entities other than the I/O resource.

5. The method of claim 4, the method further comprising:
in response to determining that for the plurality of predetermined intervals of time, the CPU utilization is greater than the second predetermined threshold, performing the configuring of the reserved CPU as the dedicated CPU to process tasks for the I/O resource.

6. The method of claim 5, the method further comprising:
in response to determining that for one predetermined interval of time, the CPU utilization is greater than a third predetermined threshold, performing the configuring of the reserved CPU as the dedicated CPU to process tasks for the I/O resource.

7. The method of claim 6, wherein the third predetermined threshold is greater than the second predetermined threshold, and wherein the second predetermined threshold is greater than the first predetermined threshold.

8. A system, comprising:
a memory; and
at least one central processing unit (CPU), wherein the at least one CPU performs operations, the operations comprising:
allocating a plurality of central processing units (CPUs) as a set of dedicated CPUs for processing tasks of an input/output (I/O) resource, wherein the plurality of CPUs form a group, and wherein allocated CPUs are not transferable from one group to another group;
determining whether performance requirements of the I/O resource are being met;
in response to determining that performance requirements of the I/O resource are not being met, determining whether there is a reserved CPU in the group that is performing tasks other than the tasks of the I/O resource, and in response to determining there is a reserved CPU in the group performing tasks other than the tasks of the I/O resource, switching the reserved CPU to become a dedicated CPU for processing the tasks of the I/O resource;
in response to determining that performance requirements of the I/O resource are being met, determining whether it is feasible to meet the performance requirements of the I/O resource with fewer than a number of dedicated CPUs allocated for processing the tasks of the I/O resource, and in response to determining that it is feasible to meet the performance requirements of the I/O resource with fewer than the number of dedicated CPUs allocated for processing the tasks of the I/O resource, deallocating a dedicated CPU from the group and indicating the dedicated CPU that is deallocated to be a reserved CPU belonging to the group, wherein the reserved CPU for the group is usable for processing tasks other than the tasks of the I/O resource;

in response to determining that a CPU utilization for the set of dedicated CPUs is less than a first predetermined threshold, configuring at least one CPU of the set of dedicated CPUs as a reserved CPU to execute tasks for one or more entities other than the I/O resource; and in response to determining that the CPU utilization for the set of dedicated CPUs is greater than a second predetermined threshold, configuring the reserved CPU as a dedicated CPU to process tasks for the I/O resource.

9. The system of claim 8, wherein the I/O resource has higher requirements for performance in comparison to the one or more entities other than the I/O resource, and wherein the second predetermined threshold is greater than the first predetermined threshold.

10. The system of claim 9, wherein the I/O resource is a host bus adapter that communicatively couples a storage controller to a host computational device, or a device adapter that communicatively couples the storage controller to a storage device, and wherein the storage controller responds to I/O requests from the host computational device by retrieving data from the storage device.

11. The system of claim 8, the operations further comprising:
setting a predetermined interval of time; and
in response to determining that for a plurality of predetermined intervals of time, the CPU utilization is less than the first predetermined threshold, performing the configuring of the at least one CPU of the set of dedicated CPUs as the reserved CPU to execute tasks for one or more entities other than the I/O resource.

12. The system of claim 11, the operations further comprising:
in response to determining that for the plurality of predetermined intervals of time, the CPU utilization is greater than the second predetermined threshold, performing the configuring of the reserved CPU as the dedicated CPU to process tasks for the I/O resource.

13. The system of claim 12, the operations further comprising:
in response to determining that for one predetermined interval of time, the CPU utilization is greater than a third predetermined threshold, performing the configuring of the reserved CPU as the dedicated CPU to process tasks for the I/O resource.

14. The system of claim 13, wherein the third predetermined threshold is greater than the second predetermined threshold, and wherein the second predetermined threshold is greater than the first predetermined threshold.

15. A computer program product, the computer program product comprising a computer readable storage medium having computer readable program code embodied therewith, the computer readable program code configured to perform operations, the operations comprising:

allocating a plurality of central processing units (CPUs) as a set of dedicated CPUs for processing tasks of an input/output (I/O) resource, wherein the plurality of CPUs form a group, and wherein allocated CPUs are not transferable from one group to another group;

determining whether performance requirements of the I/O resource are being met;

in response to determining that performance requirements of the I/O resource are not being met, determining whether there is a reserved CPU in the group that is performing tasks other than the tasks of the I/O resource, and in response to determining there is a reserved CPU in the group performing tasks other than the tasks of the I/O resource, switching the reserved CPU to become a dedicated CPU for processing the tasks of the I/O resource;

in response to determining that performance requirements of the I/O resource are being met, determining whether it is feasible to meet the performance requirements of the I/O resource with fewer than a number of dedicated CPUs allocated for processing the tasks of the I/O resource, and in response to determining that it is feasible to meet the performance requirements of the I/O resource with fewer than the number of dedicated CPUs allocated for processing the tasks of the I/O resource, deallocating a dedicated CPU from the group and indicating the dedicated CPU that is deallocated to be a reserved CPU belonging to the group, wherein the reserved CPU for the group is usable for processing tasks other than the tasks of the I/O resource;

in response to determining that a CPU utilization for the set of dedicated CPUs is less than a first predetermined threshold, configuring at least one CPU of the set of dedicated CPUs as a reserved CPU to execute tasks for one or more entities other than the I/O resource; and in response to determining that the CPU utilization for the set of dedicated CPUs is greater than a second predetermined threshold, configuring the reserved CPU as a dedicated CPU to process tasks for the I/O resource.

16. The computer program product of claim 15, wherein the I/O resource has higher requirements for performance in comparison to the one or more entities other than the I/O resource, and wherein the second predetermined threshold is greater than the first predetermined threshold.

17. The computer program product of claim 16, wherein the I/O resource is a host bus adapter that communicatively couples a storage controller to a host computational device, or a device adapter that communicatively couples the storage controller to a storage device, and wherein the storage controller responds to I/O requests from the host computational device by retrieving data from the storage device.

18. The computer program product of claim 15, the operations further comprising:

setting a predetermined interval of time; and in response to determining that for a plurality of predetermined intervals of time that the CPU utilization is less than the first predetermined threshold, performing the configuring of the at least one CPU of the set of dedicated CPUs as the reserved CPU to execute tasks for one or more entities other than the I/O resource.

19. The computer program product of claim 18, the operations further comprising:

in response to determining that for the plurality of predetermined intervals of time, the CPU utilization is greater than the second predetermined threshold, performing the configuring of the reserved CPU as the dedicated CPU to process tasks for the I/O resource.

20. The computer program product of claim 19, the operations further comprising:

in response to determining that for one predetermined interval of time, the CPU utilization is greater than a third predetermined threshold, performing the configuring of the reserved CPU as the dedicated CPU to process tasks for the I/O resource.

* * * * *